(12) United States Patent
Ray et al.

(10) Patent No.: US 11,163,837 B2
(45) Date of Patent: *Nov. 2, 2021

(54) EXTRACTION OF INFORMATION AND SMART ANNOTATION OF RELEVANT INFORMATION WITHIN COMPLEX DOCUMENTS

(71) Applicant: International Business Machines Corporation, Armonk, NY (US)

(72) Inventors: Ritwik Ray, Cary, NC (US); Marie Angelopoulos, Cortlandt Manor, NY (US); Frederick Roberts, Franklin, TN (US); Christopher Gagen, Perrysburg, OH (US); Maria Gabrani, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,129

(22) Filed: Jun. 18, 2019

(65) Prior Publication Data

US 2019/0303412 A1 Oct. 3, 2019

Related U.S. Application Data

(63) Continuation of application No. 15/894,109, filed on Feb. 12, 2018.

(51) Int. Cl.
*G06F 40/20* (2020.01)
*G06F 16/93* (2019.01)
(Continued)

(52) U.S. Cl.
CPC ............ *G06F 16/93* (2019.01); *G06F 16/245* (2019.01); *G06F 16/248* (2019.01);
(Continued)

(58) Field of Classification Search
CPC ........ G06F 16/35; G06F 16/906; G06F 40/30; G06F 40/169; G06F 40/205; G06F 16/244; G06F 40/20
See application file for complete search history.

(56) References Cited

U.S. PATENT DOCUMENTS

2010/0228693 A1* 9/2010 Dawson ................ G06F 16/322
706/12
2012/0254143 A1 10/2012 Varma et al.
(Continued)

OTHER PUBLICATIONS

List of IBM Patents or Patent Applications Treated as Related, filed Jun. 18, 2019.

*Primary Examiner* — Marcin R Filipczyk
(74) *Attorney, Agent, or Firm* — Will Stock; Edell, Shapiro & Finnan, LLC (57) ABSTRACT

Methods and systems are provided to extract information within complex documents, and the extracted information may be compared to identify differences between complex documents or the extracted information may be analyzed with respect to the individual document. Information is extracted from complex documents comprising unstructured data to create a structured data repository, or analytics knowledge base. This database may be utilized to compare concepts that are common to one or more documents, allowing ease of comparison of documents, and identification of information that is different or identification of (same or similar) information that is presented differently in a set of complex documents.

11 Claims, 7 Drawing Sheets

(51) Int. Cl.
*G06N 5/00* (2006.01)
*G06F 16/245* (2019.01)
*G06F 16/248* (2019.01)
*G06F 40/169* (2020.01)
*G06N 20/00* (2019.01)

(52) U.S. Cl.
CPC ............ *G06F 40/169* (2020.01); *G06F 40/20* (2020.01); *G06N 5/003* (2013.01); *G06N 20/00* (2019.01)

(56) References Cited

U.S. PATENT DOCUMENTS

| | | | |
|---|---|---|---|
| 2016/0085919 A1* | 3/2016 | Sohr | G06F 19/00 705/3 |
| 2019/0114370 A1* | 4/2019 | Cerino | G06K 9/00469 |
| 2019/0251182 A1 | 8/2019 | Ray et al. | |

* cited by examiner

| PLAN SPONSOR | PLAN | ENTITY TYPE | VALUE | CONDITIONS |
|---|---|---|---|---|
| EMPLOYER1 | PPO PLAN | COINSURANCE | 30% | EMERGENCY ROOM, IN NETWORK |
| EMPLOYER1 | FLEX PLAN | EXCLUDED TREATMENT | COSMETIC SURGERY | ...EXCEPT WHEN AS A RESULT OF BODILY INJURY |
| INSURER1 | PPO PLAN | COINSURANCE | 20% | EMERGENCY ROOM, IN NETWORK |
| INSURER1 | HSA PLAN | EXCLUDED TREATMENT | COSMETIC SURGERY | ...WITHOUT IMPROVING OR RESTORING PHYSIOLOGIC FUNCTION |

EXTRACTION OF INFORMATION AND SMART ANNOTATION OF RELEVANT INFORMATION WITHIN COMPLEX DOCUMENTS

BACKGROUND

1. Technical Field

Present invention embodiments relate to extracting data from documents, and more specifically, to identifying the presence or absence of a key term or concept, which may be a unique key term or concept, in a complex document, extracting information related to the key term or concept, and/or comparing the extracted information.

2. Discussion of the Related Art

With the advent of sophisticated document generation and processing programs, it has become routine to generate complex documents comprising tables, graphs, and unstructured text. Such documents may be hundreds or even thousands of pages in length. Often, such documents are modified or merged with other documents, at least on an annual basis, making it difficult to compare information between various versions of documents.

Additionally, in certain industries, such as the health insurance industry, documents may describe personalized or customized plan information specific to an organization. While each plan may vary from company to company, common concepts (e.g., deductible, co-pay, formulary, etc.) will be present in each document. In some cases, the same style of document, e.g., based on a common or similar template, may be provided, wherein each document is customized to the needs of a particular group. However, it is difficult to parse through such large, complex documents to find a key item or concept or an answer to a question about the content of the complex document.

For example, Health Insurance Benefit Coverage Summary Plan Descriptions (SPDs), which describe medical, dental, vision and other health benefit coverage, are often more than several hundred pages long. SPDs are structured to comply with regulatory requirements laid down by government and other statutory bodies. Because these documents are required to comply with federal law regulations, SPDs contain many similarities, but are tailored to individual health plans for the respective organization for which a health care plan is provided, which is the underlying cause for the significant variations in the content.

Such documents are difficult to understand by most people, and participants in the health plan often have difficulty locating information that is key to their question within such large, complex document(s), particularly when participants are in need of care for themselves or someone in their family. Additionally, it is difficult to identify specific changes in coverage from year to year as the same terminology may not be consistently applied.

Further, it is difficult to apply business analytics (e.g., to benefit health care plan design and benchmarking) to unstructured text data with complex terminology, and it is difficult for employees to understand the terminology to determine which aspects of medical care are covered, and which are not.

In particular, unstructured data provides particular challenges with regard to: usability, volume, variability, and quality. Regarding content format variability, documents may have information represented in multiple formats (e.g., unstructured text, diagrams, tables, figures, charts, etc.) and consumption of this type of data for decision making is challenging.

Regarding volume, unstructured data is growing at a rate of approximately 62% per year, further complicating collection and extraction of data. Regarding variability, such documents often have a wide range of styles, formats, and codes with similar intents. Regarding quality, such documents frequently originate from different sources and have a high level of ambiguity in natural language. Accordingly, managing such documents is difficult, time consuming, and complex. Health benefits is one such type of complex document, other complex documents include but are not limited to insurance documents (e.g., home or auto), policy documents (e.g., employment, government), legal documents, etc.

SUMMARY

According to embodiments of the present invention, methods and systems are provided for extraction of information from complex documents comprising unstructured data to create a structured data repository. Such techniques may include using Natural Language Processing (NLP) in combination with machine learning and cognitive systems to identify relevant data.

According to embodiments of the invention, information may be extracted from a plurality of complex documents, and the extracted information may be mapped to a semantic representation. Information may be extracted from text or non-text elements in the plurality of complex documents. Extracted information may include text extraction, symbol extraction, numerical extraction, and so forth, with such information extracted from any suitable location in the complex document, including text, tables, lists, charts, graphs, etc. Natural language processing and machine learning may be utilized to extract one or more entities from the semantic representation. Structured data comprising the extracted entities is generated from the semantic representation and corresponding attributes. In response to receiving a user query, a subset of the structured data corresponding to the query is returned, wherein the subset of structured data may be arranged to correlate entities with corresponding attributes for each complex document. Information, unless otherwise indicated, generally refers to unstructured text, which may include but is not limited to symbols, numbers, and alphanumeric characters, etc. associated with free text as well as other types of formatted data including but not limited to tables, charts, graphs, lists, etc.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other features and advantages of the present disclosure will become more apparent.

DETAILED DESCRIPTION

According to an embodiment of the present invention, methods and techniques are provided to extract information from complex documents comprising unstructured data to create a structured data repository, or analytics knowledge base that is easy to understand and provide information in a timely manner without the complexity involved in understanding terms, e.g., such as healthcare terms. This database may be utilized to compare concepts that are common to one or more documents, may include unique concepts present in one complex documents, and may allow ease of comparison of information common to documents and identification of information unique to documents.

Figure 1:
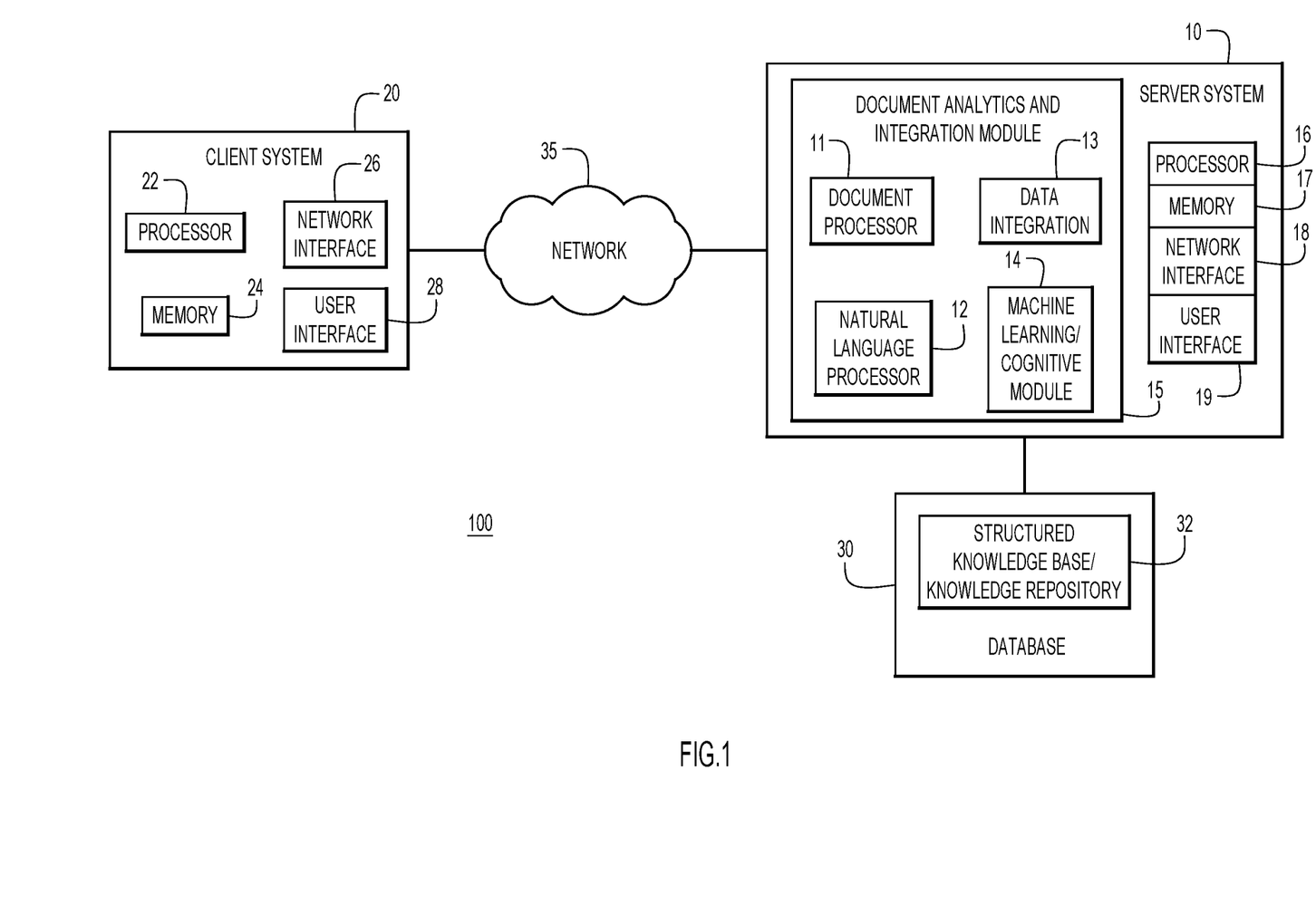
FIG. 1 is a block diagram of an example computing environment, according to embodiments of the invention.

With reference now to FIG. 1, an example computing environment 100 is provided for use with present invention embodiments. Specifically, the environment 100 includes one or more server systems 10, and one or more client or end-user systems 20. Server systems 10 and client systems 20 may be remote from each other and may communicate over a network 35. The network may be implemented by any number of any suitable communications media (e.g., wide area network (WAN), local area network (LAN), Internet, Intranet, etc.). Alternatively, server systems 10 and client systems 20 may be local to each other, and may communicate via any appropriate local communication medium (e.g., local area network (LAN), hardwire, wireless link, Intranet, etc.).

Client systems 20 enable users to submit documents (e.g., complex documents, large documents comprising unstructured text, charts, figures, tables, etc., documents for concept comparison, etc.) to server systems 10 to extract and identify types of information common to each document. The client systems may present a graphical user (e.g., GUI, etc.) or other interface 28 (e.g., command line prompts, menu screens, etc.) to solicit information from users pertaining to the desired documents and analysis, and may provide reports including analysis results (e.g., text analytics, tables, answers to specific database queries, etc.). The server systems may include a document analytics and integration module 15 to extract and integrate information for the structured knowledge base. A database system 30 may store various types of information (e.g., structured data) for analytics and integration to generate structured data.

The database system 30 may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.).

Server systems 10 may be implemented by any conventional or other computer systems preferably equipped with a display or monitor, a base (e.g., including at least one hardware processor 16 (e.g., microprocessor, controller, central processing unit (CPU), etc.), one or more memories 17 and/or internal or external network interfaces or communications devices 18 (e.g., modem, network cards, etc.)), user interface 19 comprising optional input devices (e.g., a keyboard, mouse or other input device), and any commercially available and custom software (e.g., server/communications software, document analytics and integration module 15, etc.).

Client systems 20 may be implemented by any conventional or other computer systems preferably equipped with a display or monitor, a base (e.g., including at least one hardware processor 22 (e.g., microprocessor, controller, central processing unit (CPU), etc.), one or more memories 24 and/or internal or external network interfaces or communications devices 26 (e.g., modem, network cards, etc.)), user interface 28 comprising optional input devices (e.g., a keyboard, mouse or other input device), and any commercially available and custom software (e.g., browser/interface software, etc.). Client systems 20 allow users to provide and select documents or analysis, and to view the results of the analysis through, e.g., user interface 28.

Alternatively, one or more client systems 20 may analyze documents to extract and integrate information to create structured data pertaining to common concepts between documents, when operating as a stand-alone unit. In a stand-alone mode of operation, the client system stores or has access to the data (e.g., complex documents, large documents comprising unstructured text, charts, figures, tables, etc., documents for concept comparison, etc.), and includes a module to perform document analytics and data integration to generate structured data (similar to server system 10). The graphical user (e.g., GUI, etc.) or other user interface 28 (e.g., command line prompts, menu screens, etc.) solicits information from a corresponding user pertaining to the desired documents and analysis, and may provide reports including analysis results. Client system 20 may directly interact with database 30 to provide structured data for storage and to access structured data in response to queries.

Document analytics and integration module 15 may include one or more modules or units to perform the various functions of present invention embodiments described throughout the application. The various modules (e.g., document processor module 11, natural language processor (NLP) module 12, data integration module 13, and machine learning cognitive module 14, etc.) may be implemented by any combination of any quantity of software and/or hardware modules or units, and may reside within memory 17 of the server for execution by processor 16.

Document processor module 11 generates a semantic representation of the document, including tables and graphs for extraction. Natural language processor (NLP) module 12 extracts and annotates information from the document(s). NLP technology has the ability to read, understand, reason and provide intelligence for making more informed decisions. In some embodiments, NLP module may be integrated with or may communicate directly with machine learning/ cognitive module 14, or with any other data repository comprising related information. Data integration module 13 consolidates extracted and annotated information, placing such information in a structured framework that can be easily incorporated into a database. Once integrated, various common concepts present in the documents can be compared in a side-by-side format. Alternatively, unique concepts identified in a particular complex document may be presented. Machine learning cognitive module 14 may be used as part of annotating or labeling information and constructing data sets for training as provided herein.

Figure 2A:
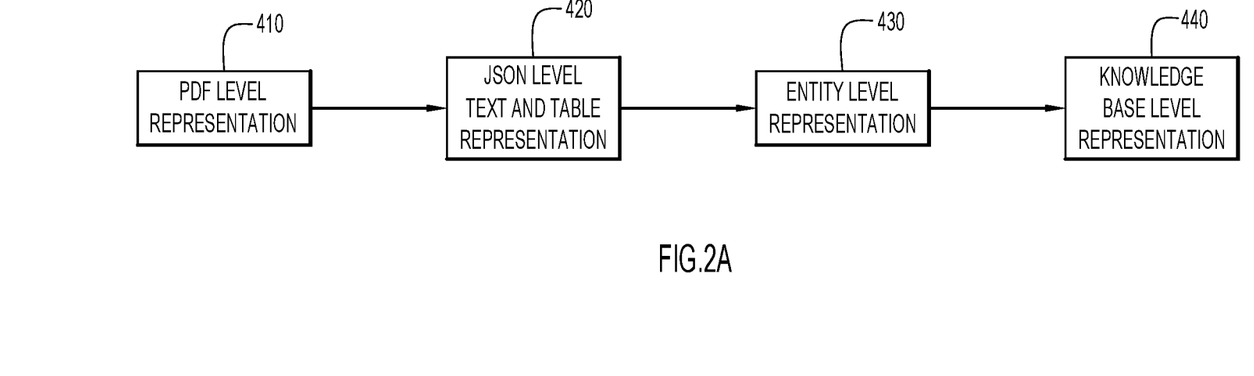
FIG. 2A-2B is an example flowchart showing levels of data representation for document analysis, according to embodiments of the invention.

FIG. 2A shows data transformations at various stages of operations of the embodiments provided herein. At element 410, the document to be analyzed is in a PDF level representation. At element 420, the content of the document (e.g., information such as free text including text, numerical information, symbolic information, etc. along with formatted text (e.g., text in tables, lists, charts, spreadsheets, graphs, etc.) and their respective structure is represented by a JSON level representation. Thus, once the PDF document has been ingested, the document may be represented using a JSON level representation. During various stages of this process, including document processing, information extraction, and definition of entities, the document may also be represented using a JSON level representation. At element 430, the content of the document is sampled to extract the subject specific information which is represented by an entity level representation. Entity level representations may be utilized at the output of natural language processing and machine learning. At element 440, a knowledge base level representation is generated, representing the data (e.g., extracted entities and associated information or attributes) within the knowledge based system.

The extracted information from a complex document may be formatted as a JavaScript Object Notation (JSON), a text-based document. JSON is a lightweight data-interchange format, which is easy for machines to parse and generate. Other formats are also possible, such as html or xml. However, JSON is typically more easily consumable by computational components for further analysis. JSON represents data by a series of objects, with the objects comprising attributes and values of attributes with which to describe the object. Transforming the data into an annotated JSON format provides a way in which to impart structure to unstructured data. Annotation may be performed manually, semi-manually, or in an automated manner using machine learning and natural language processing.

Once annotated in JSON format, entities may be readily identified (e.g., during import into a database or other system) by a machine learning/natural language processing (ML)/(NLP) system, and entities along with corresponding information or attributes for a plurality of documents may be aggregated, for assembly and display in an integrated format. Alternatively, unique concepts may be identified and presented to a user.

Figure 3:
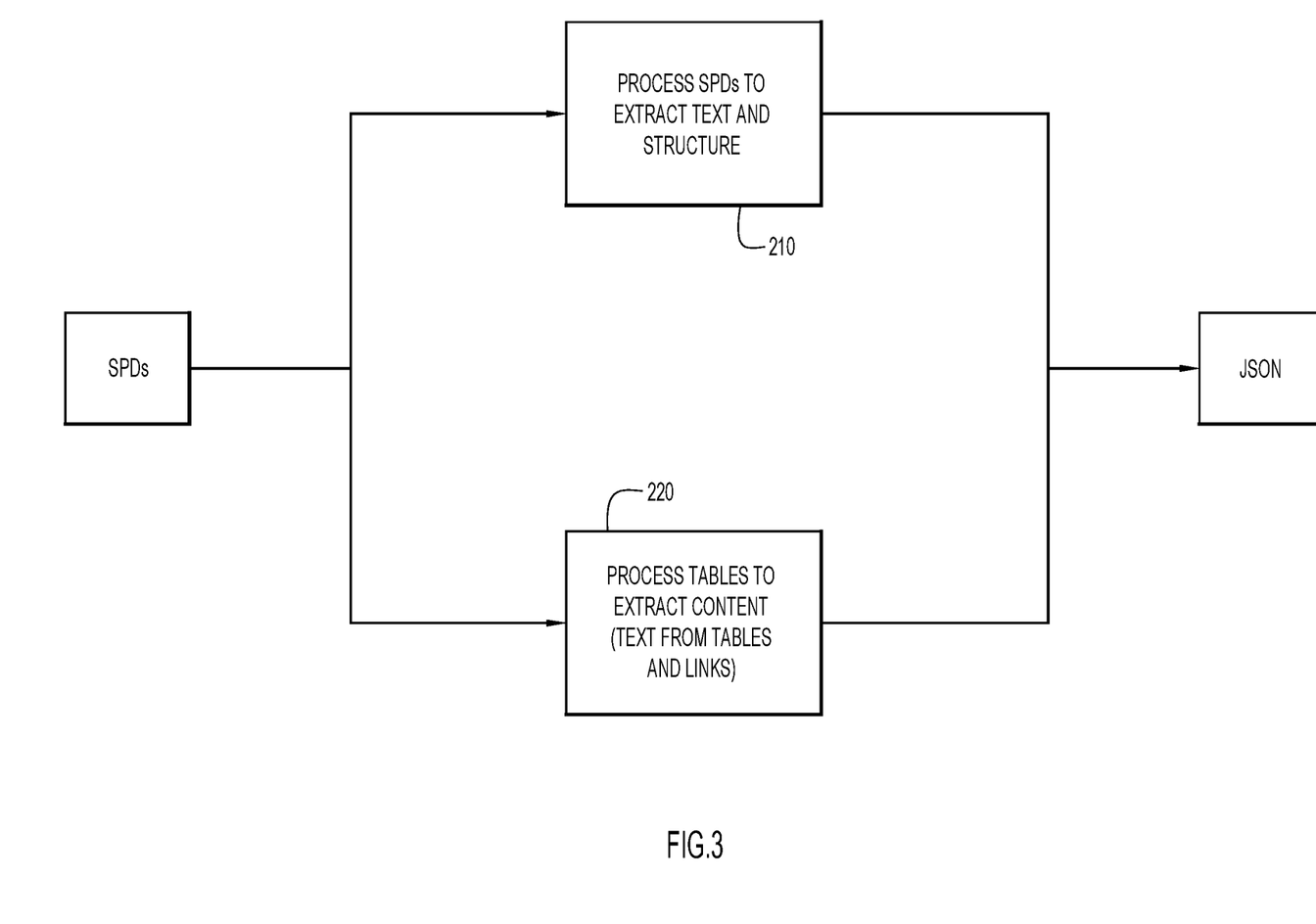
FIG. 3 is an example flowchart showing operations for document processing and information extraction, according to embodiments of the invention.
Figure 4:
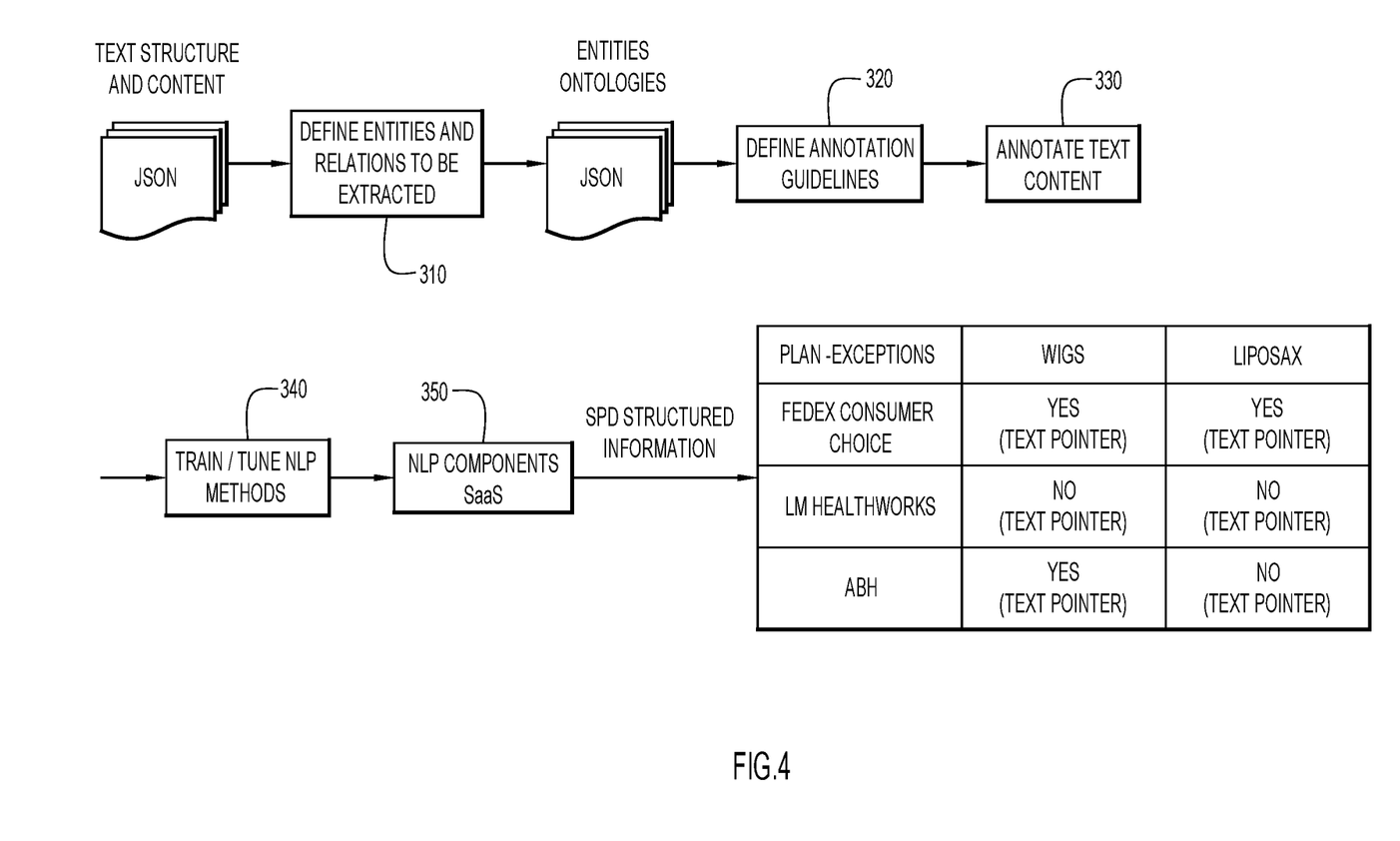
FIG. 4 is an example flowchart showing operations for annotating and applying natural language processing to complex documents, according to embodiments of the invention.

Particular operations are outlined in FIG. 3 and FIG. 4, which provide operations for identifying subject-specific entities and using surrounding context to understand the identified entities. This information is organized in a queryable knowledge base that may be integrated with other applications.

Figure 2B:
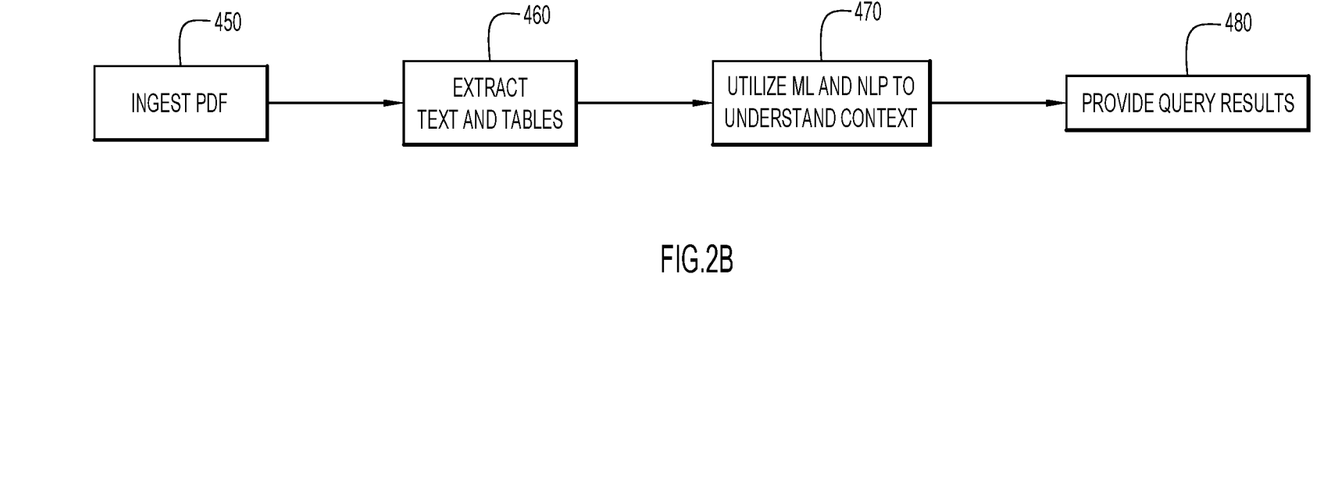

FIG. 2B shows a process for extracting and viewing common features between the complex pdf documents. This process involves, at operation 450, ingesting the plurality of SPDs (e.g., pdfs, doc, docx, html, xml, etc.). The output of the ingested document may be provided in a source-independent format (e.g., JSON) with a standardized schema. At operation 460, information is extracted from the document, e.g., using a PDF parser or other document parser, regardless of the characteristics of the document (e.g., see, FIG. 3). At operation 470, semantic, machine learning (ML), and/or natural language processing (NLP) is used to understand the extracted information and identify entities (e.g., see, FIGS. 4, 6, 7). In some embodiments, a supervised machine learning approach may be used to semantically annotate the content of the document (e.g., section text, section title, table, etc.). In other aspects, the training data may be generated using a document annotation engine (e.g., Smart Annotator). The output schema and the training data (with annotation labels) are defined in a coordinated way and aim to cover all types of variabilities anticipated to be present in a document. To address variability between documents, different models that address different documents characteristics (e.g., single column, double column, triple column, different document types, tables, text, etc.) may be developed. At operation 480, query results are provided in a common format (e.g., a structured format).

FIG. 3 is a flowchart showing operations associated with document processing and information extraction according to embodiments of the invention. In some embodiments, the documents to be analyzed may include one or more PDFs. The PDFs may be text searchable or may need to undergo optical character recognition (OCR) prior to document analysis. In general, the documents comprise a set of information that is common between documents. For example, the documents may be a SPD, e.g., for medical, dental, vision, disability, or any other benefit and insurance policies, each document containing information regarding copays, deductibles, coverage etc., which are common types of information that may vary between individual documents customized to particular groups of individuals (e.g., individuals associated with a company).

At operation 210, the document (e.g., a PDF document) is pre-processed by document processor module 11 (e.g., a Smart Annotator) to extract information and structure, e.g., using a PDF parser. This process is used to understand the structural format of the document, including but not limited to segmentations such as headers, columns, free text, tables, pages, pictures, and lists. In some aspects, OCR technology may be used to extract information from image-based files. At operation 220, tables are processed to extract content/information within the tables, e.g., links, text, numbers, symbols, etc. To extract information from a table, row and column header information is identified and associated with the data elements in the JSON file, to ensure that the context of the extracted data is maintained.

In some embodiments, the extracted information may be extracted from unformatted sections of the complex document. Unformatted information includes free text-based sections comprising text, numbers, symbols, etc. In other embodiments, the extracted information may be extracted from formatted sections of the complex document. Formatted information includes formatted information presented as a table, chart, graph, picture, list, footnote, spreadsheet, header, etc.

In some embodiments, the extracted data is stored and arranged in a JSON file such that the extracted data can be identified and processed by a query while maintaining proper context. In some embodiments, free text, table information, and list information may each be extracted separately and stored in the JSON file.

The extracted information may be mapped to a semantic representation, and the ML/NLP system may be used to extract entities from the mapped semantic representation.

Structured data comprising the extracted entities from the semantic representation and corresponding attributes may be generated. For example, for the entity coinsurance, corresponding attributes include plan, plan sponsor, conditions, etc. If a user queries the term "coinsurance", then a table or other format amenable to comparison may be generated, to display for each document the entity along with corresponding attribute values.

FIG. 4 is an example flowchart of operations of annotation and applying NLP and ML to extracted information from complex documents, according to embodiments of the invention. The output of the document analyzer (see, FIG. 3) is provided as input into the NLP pipeline. In this workflow, detailed and entity-specific relationships are produced and annotated. For example, the extracted information may be annotated, such that the type of information is identified (e.g., as a copayment type with variable amounts depending upon the selected plan, etc.).

At operation 310, entities and relationships to be extracted are defined. In some embodiments, specific entities are defined by benefit plan design subject matter experts.

At operation 320, annotation guidelines are defined. Detailed and entity-specific guidelines may be produced and used to support a manual annotation process. Annotation guidelines are developed and documents are manually annotated and evaluated for human inter-annotator agreement. At operation 330, text content, which may include alphanumeric characters and symbols, is annotated. This annotated data may be provided to the NLP/ML module as a training data set.

At operation 340, NLP methods are trained and tuned. Training data is produced from manually annotated documents, which is then leveraged by NLP for building automated machine annotation capability for each entity, and ultimately a process that searches and extracts documents for defined entities. NLP techniques include but are not limited to extracting entities, categorizing content, clustering content, fact and relationship extraction, etc. This process is provided in more detail with regards to FIGS. 6 and 7.

For example, multiple instances of a term or phrase of interest may be identified. The system may determine relevant instances and associated text from the identified instances to retrieve. This may be accomplished by pattern matching within the document for the term or phrase of interest and associated text. In other embodiments, the system may learn additional patterns to expand types of structured data included in the knowledge base.

At operation 350, NLP components are structured as a SaaS representation to provide structured information.

Figure 5:
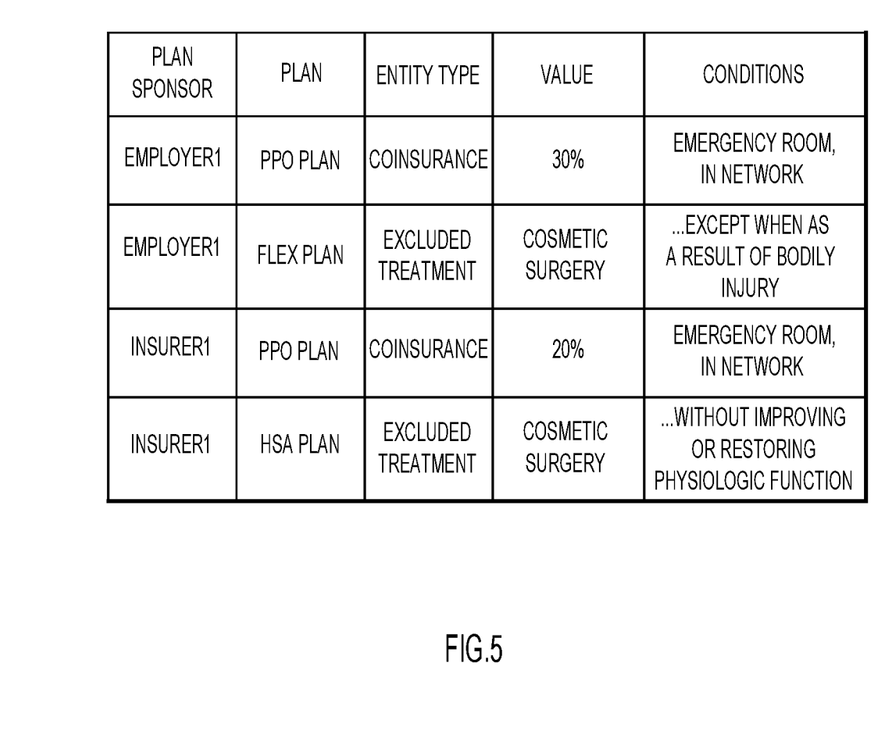
FIG. 5 is a table showing examples of types of information that can be extracted from complex documents, according to embodiments of the invention.

FIG. 5 shows a table of types of information that can be extracted and integrated according to the embodiments presented herein. As an example, and with reference to SPDs, the knowledge base may include extracted entities such as plan sponsors, plan, entity type, value, conditions/exclusions, prior authorizations, eligibility, copay, coinsurance, and out of pocket limits, etc. for the medical plan case.

Unique data arrangements in the knowledge repository 32 include multi-level descriptive context around concepts and/or entities that are extracted from documents. For example, client-specific language, terms and/or titles used by the plan sponsor are extracted and integrated to become part of the knowledge repository (e.g., job titles, benefit level, plan details, etc.).

For example, data from SPDs are extracted, integrated, and stored in knowledge repository 32, where such data may be linked to data at any level, e.g., from an aggregate level, to a plan member level, to an individual level, in order to provide information regarding aspects of benefit coverage including clinical and medical coverage, drug formularies, enrollment periods, disability coverage, dental coverage, vision coverage, financial costs, and any other aspect of employer, insurer, or plan sponsor data.

Figure 6:
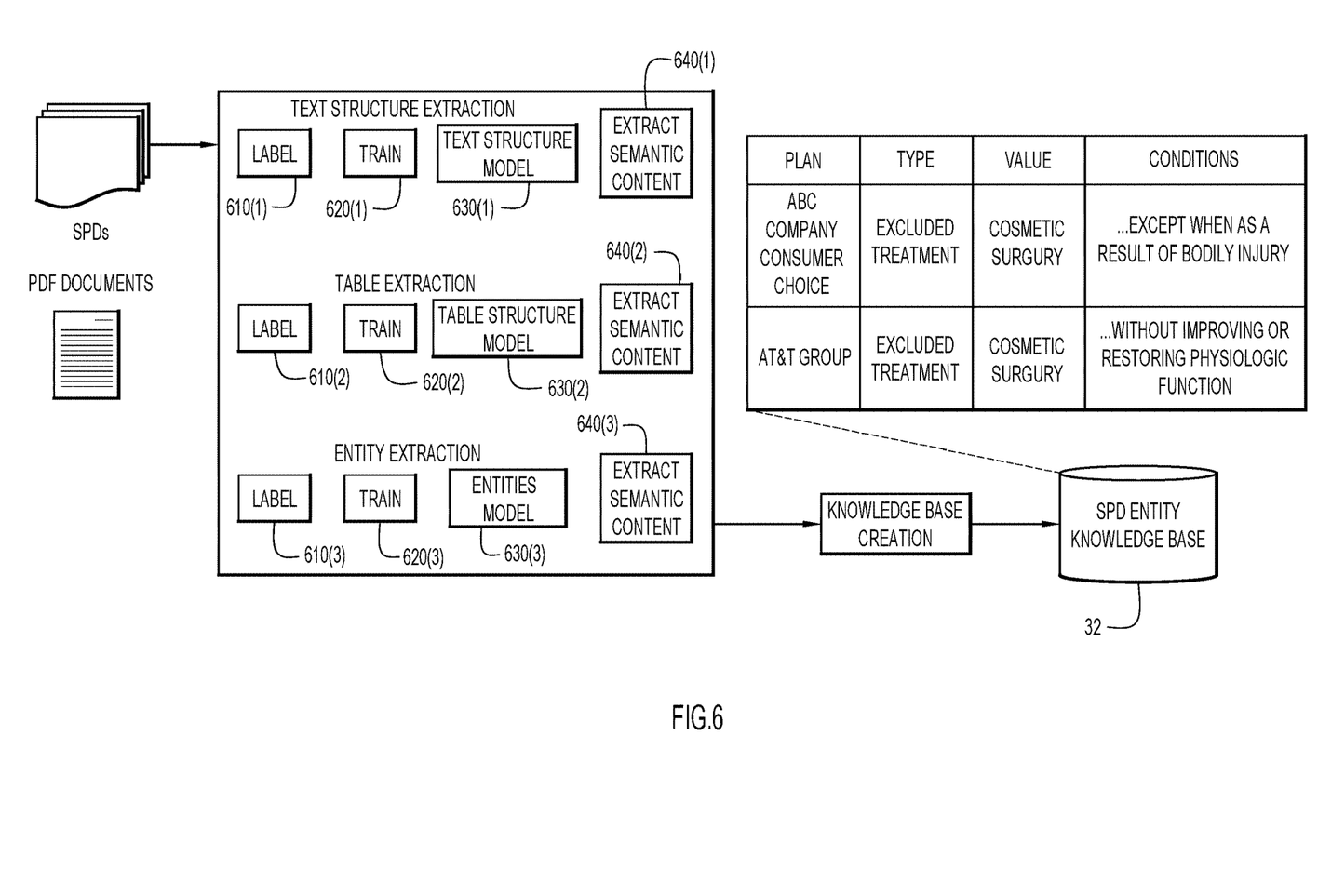
FIG. 6 shows an example machine learning based implementation of a workflow for transforming a complex document into a knowledgebase, according to embodiments of the invention.

FIG. 6 shows an example embodiment of integrating machine learning into the extraction, NLP and annotation, and integration processes provided herein.

At operations 610(1)-610(3), content of the complex documents may be labeled as text, as a table, as an entity, etc. At operation 620(1)-620(3), this content may be provided as training data to a machine learning system, which generates a classification model from the training data. In some embodiments, a text structure model 630(1), a table structure model 630(2), and an entities model 630(3) are separately generated and used to analyze the content of the pdf documents. The complex documents may be processed by one or more NLP and/or ML based programs specifically configured to extract information from text, to extract information from non-text elements (e.g., images, spreadsheets, tables, lists, etc.) embedded within the complex document, and/or to identify entities. Once the ML models have been sufficiently trained, semantic content is extracted at operations 640(1)-640(3). This information is used to create a knowledge base, based on the SPD entity information.

A knowledge repository of data that is logically related or logically linked is created along with associated metadata. The knowledge repository 32 may be accessed using a platform that provides a way for applications to search for and deliver relevant information.

The knowledge repository 32 is a database composed of data that has been extracted by the document understanding process (see, FIG. 3), NLP process (see, FIG. 4), etc. of a corpus of documents. The knowledge base may be queried by various end-user interfaces, e.g., a chat bot, a SQL query, or any other preferred method.

Figure 7:
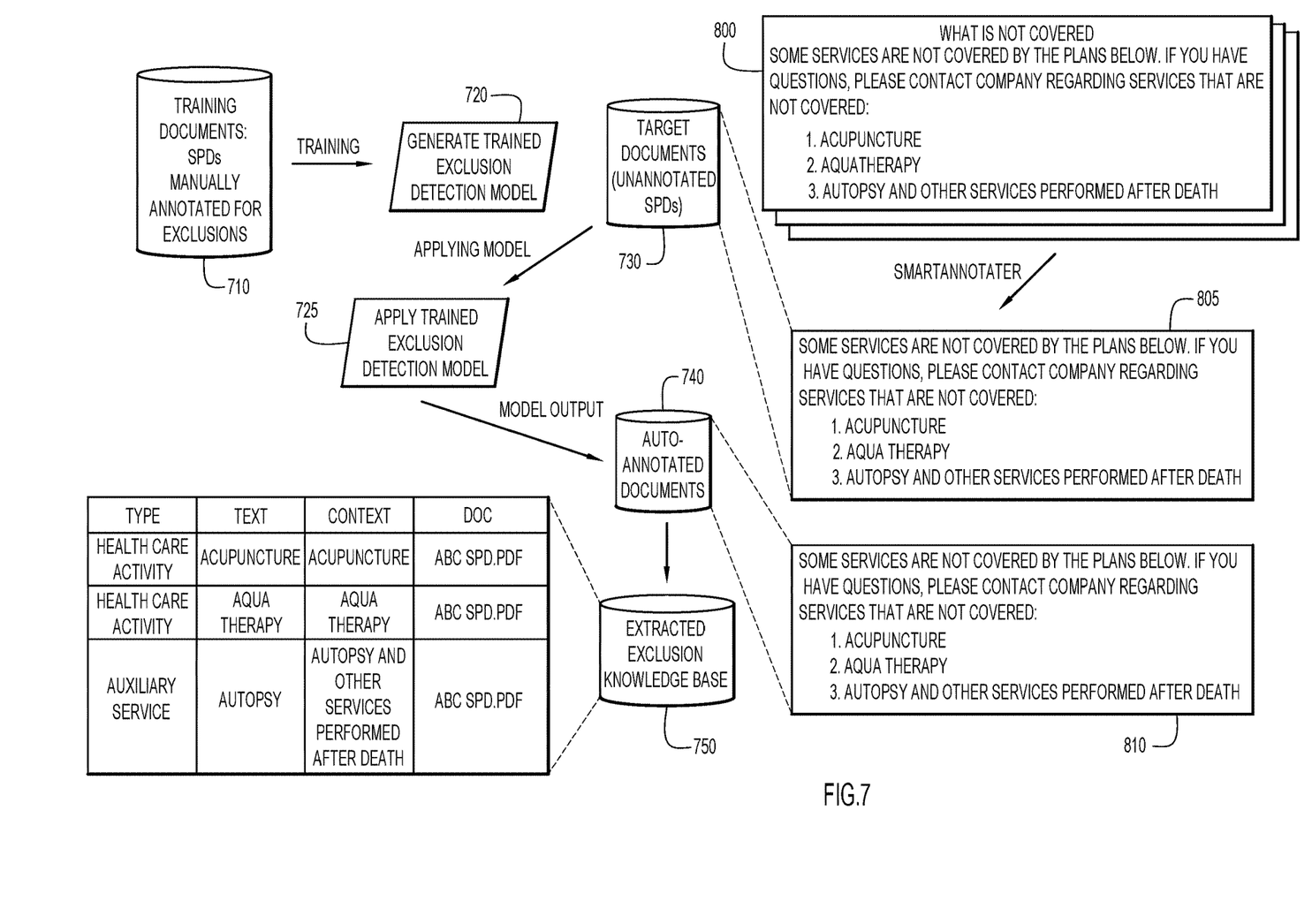
FIG. 7 shows an example machine learning based implementation of document annotation and training machine learning models for extracting and assembling information from complex documents, according to embodiments of the invention.

FIG. 7 shows an example machine learning based implementation of document annotation and training machine learning models for extracting and assembling information from complex documents, according to embodiments of the invention. At operation 710, training documents are provided. Training documents may include SPDs (e.g. at least 5 or at least 50) that have been manually annotated for an entity type, e.g., exclusions. For example, a plan with language "The Plan does not provide inpatient mental health benefits to dependents" may be annotated as an Exclusion Clause, and labeled as an excluded health care activity "ExcHCA" type. The ML/NLP models may be trained on this training data to generate a trained exclusion detection model, at operation 720. Once the model has been developed, it may be used to analyze other complex PDFs. At operation 730, target documents (e.g., up to 200 or more SPDs) are provided to the trained exclusion model, and at operation 725, the trained exclusion detection model analyzes the documents. At operation 740, the unannotated documentation are auto-annotated by the trained exclusion detection model. At operation 750, the annotated data is provided to database 750 to generate an extracted exclusion knowledge base. This type of process may be repeated to capture other functionality as needed. Shown alongside this process are the original pdf 800, the extracted content 805, and the ML-NLP automatically annotated content 810.

The methods and systems provided herein may be applied to a wide range of healthcare related documents to create a knowledge base of information that can be cross linked to provide insights and analytics that are easily consumable and available to a wide range of applications. These methods and systems are not dependent upon the availability of human subject matter experts, which can be both scarce and expensive, and have the ability to perform complex extractions and comparisons for a large number of complex documents.

The information extracted from the complex documents may be compared when the information is presented differently between the complex documents. For example, the semantic representation of the text and non-text parts of the documents (e.g., once in a suitable format such as JSON) may be generated irrespective of how the information is originally present in the complex document. Accordingly, a set of a complex documents that have each been formatted differently or designed to have information distributed across text and non-text elements, may be captured using a semantic representation. For example, a type of information formatted in a table in a first complex document, formatted as free text in a second complex document, and formatted in a list in a third complex document may all be compared using the techniques provided herein. Further, the machine learning system may use a "global" semantic representation to learn where the entities may be located within a document, since this data structure or semantic representation encompasses the entities, their context, and the relative information that indicates where the information may be found in the individual complex documents.

In some aspects, present invention embodiments may be used to analyze Summary Plan Descriptions (SPDs), which are large documents varying in format, order, and complexity, to provide a plan member with information regarding specific benefit coverage. Additionally, plan sponsors (e.g., government agencies, corporate employers, or health plan administrators, etc.) may wish to compare features of health care benefits of plans offered/supported within the organization for their employees and other organization's plans, to gain more insights into benefit design strategy. Comparisons may include comparison of regional benchmarks, of competitor plans, of plans from mergers and acquisitions, or of multiple plans offered by the same organization. By comparing plans, differences in covered services, plan eligibility, cost share details, plan networks, special programs, as well as detailed context around features can be identified.

For example, Company A may be considering acquiring Company B and Company C. Each company may have its own benefit package, described in documents with varying characteristics, and therefore, it is difficult to compare the benefits offered by each company, when performed manually because it can be very time consuming and resource/cost intensive. To perform due diligence, an HR Director would need to compare for each company: types of coverage, conditions that are covered, special programs offering additional benefits, etc. A financial analyst would need to compare for each plan: the actuarial value of the plan and how much of the financial risk belongs to the plan vs. the member (e.g., cost share attributes), as well as understand which financial liabilities can be mitigated or changed to meet financial targets. In other aspects, a plan in the knowledge base can potentially be leveraged 'individually' by the member, plan sponsor, health-plan, or even provider, e.g., to provide answers to an individual regarding a particular plan. In this embodiments, information does not need to be compared, but rather, extracted and returned to the user in response to a query.

Present invention embodiments provide an easy-to-use, robust, queryable, side-by-side comparison of a plurality of plans. A user providing queries to the system provided herein, may access both high-level information illustrating differences between plans as well as detail-level context pertaining to the high level differences. As a specific example, all three plans may cover bariatric surgery, but Plan B may exclude coverage for dependents. Similarly, Plan A and Plan B may have coinsurance of 80%, whereas Plan C may offer coinsurance of 75% unless a Center of Excellence (COE) is used, which increases coverage to 90%. Present invention embodiments allow for information to be accessed in the documents regardless of the characteristics of the document, e.g., whether the information is in tabular format or in free text, and may be accessed at any location within the document.

Additional applications of present invention embodiments include integrating with products that help employees select a plan during open enrollment; integration with products that model the financial impact of plan design changes, including changes to actuarial values; integration with systems to link plan design options to value based care and utilization; integration with virtual agents to answer plan specific questions (e.g., Do I have coverage for bariatric surgery?); and integration with systems to compare a reference SPD to competition SPD, benchmarks, legal requirements, and/or creating new SPDs.

In yet another aspect, documents that contain the same type of information, but according to differing characteristics (e.g., different formats such as tables, text, lists, etc. and/or different styles such as single column, double column, or triple column, etc. and/or varying font styles such as Times, Arial, etc. and/or different document types such as pdf, docx, doc, xml, html, etc.) may be extracted, analyzed and/or compared according to the techniques provided herein.

Present invention embodiments provide novel techniques for extracting information from unstructured data and creating a knowledgebase of information in a structured consumable format that provides a platform for applications to access and deliver information to end users. Documents may be analyzed to produce a semantic representation of the document along with information extracted from tables and graphs. This framework enables side by side comparison of a plurality of documents with similar types of concepts or data (e.g., SPDs). The examples provided herein may relate to the health insurance industry, and are provided for illustrative purposes, and in no way are intended to be limiting.

The techniques provided herein may be used to compare specific data across a plurality of complex documents to provide information to a user regarding a query. The system may be integrated with existing platforms, e.g., IBM's Watson, to leverage access to the knowledge base at an enterprise level.

Advantages of present invention embodiments include helping employees to understand their benefit coverage by being able to provide answers using a cognitive virtual agent (e.g., chat bot) as well as decreasing operational expenses by leveraging a chat bot instead of call center. Users may ask questions to clarify their benefit coverage when seeking medical services. In other aspects, users may perform a side-by-side comparison of benefits to analyze benefit coverage differences between different plans offered by an employer. A user may also compare benefits offered by their company to other companies in similar industries or geographical locations to understand overlaps or differences in coverage. In some aspects, provider offices may increase patient experience by providing access to the individual's benefit plan design. Benefit plan administrators may utilize the system to understand various criteria to inform benefit design and strategy, to inventory and assess plan design differences to support acquisition activity, as well as standardize and align language. In still other aspects, the impact of plan design on healthcare utilization, by linking SPD information to claims experience, can be analyzed.

The structured data repository 32 enables users (e.g., especially healthcare policy administrators and agencies) to make more informed decisions regarding understanding benefit trends in the insurance market, designing benefit packages to have the greatest impact/improvement to patient health by linking specific benefits to outcomes, and enabling a wide range of offerings.

It will be appreciated that the embodiments described above and illustrated in the drawings represent only a few of the many ways of implementing embodiments for creating a knowledge base from unstructured documents.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, document analytics and integration module 15, etc.). These systems may include any types of monitors and input devices (e.g., keyboard, mouse, voice recognition, etc.) to enter and/or view information.

It is to be understood that the software (e.g., document analytics and integration module 15, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., document analytics and integration module 15, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data from the extraction, NLP, and integration processes; data stored in the knowledge repository 32; etc.). The database system may be implemented by any number of any conventional or other databases, data stores or storage structures (e.g., files, databases, data structures, data or other repositories, etc.) to store information (e.g., data from the extraction, NLP, and integration processes, data stored in the knowledge repository 32, etc.). The database system may be included within or coupled to the server and/or client systems. The database systems and/or storage structures may be remote from or local to the computer or other processing systems, and may store any desired data (e.g., data from the extraction, NLP, and integration processes, data stored in the knowledge repository 32, etc.).

The present invention embodiments may employ any number of any type of user interface (e.g., Graphical User Interface (GUI), command-line, prompt, etc.) for obtaining or providing information (e.g., data from the extraction, NLP, and integration processes, data stored in the knowledge repository 32, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Query information provided to a user may include any information arranged in any fashion, and may be configurable based on rules or other criteria to provide desired information to a user (e.g., relevance, frequency, etc.).

The present invention embodiments are not limited to the specific tasks or algorithms described above, but may be utilized for and are widely applicable to a wide variety of industries including the health insurance industry (e.g., SPDs), financial industry, tax industry, regulatory industries, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a cognitive data processing system comprising at least one processor and at least one memory, the at least one memory comprising instructions executed by the at least one processor to cause the at least one processor to implement an intelligent annotation and data extraction system for extracting and processing information across a plurality of complex documents to provide an answer to a user query comprising:

extracting information from the plurality of complex documents, wherein a text structure model, trained with a first set of labeled data, extracts information from text of the plurality of complex documents, wherein a table structure model, trained with a second set of labeled data, extracts information from tables of the plurality of complex documents, wherein the first set of labeled data includes text from one or more Summary Plan Description documents, wherein each Summary Plan Description document describes specific health care benefit coverage for plan members, and wherein the second set of labeled data includes tables from one or more Summary Plan Description documents, wherein the Summary Plan Description documents of the first and second sets of labeled data include annotations of exclusions to the health care benefit coverage, and wherein the annotations of exclusions are determined according to an extracted exclusion knowledge base;

mapping the extracted information to a semantic representation;

utilizing a natural language process and a machine learning process to extract one or more entities from the semantic representation, wherein the machine learning process is trained with a third set of labeled data and is trained using supervised machine learning, and wherein the one or more entities include one or more of: a plan sponsor entity, a plan entity, a conditions/exclusions entity, a prior authorizations entity, an eligibility entity, a copay entity, a coinsurance entity, and an out of pocket limits entity;

generating structured data comprising the extracted entities from the semantic representation along with corresponding attributes; and providing a subset of the structured data corresponding to the query, wherein the subset of structured data may be arranged to correlate entities with corresponding attributes for one or more complex documents.

2. The method of claim 1, wherein the extracted entities are compared to determine differences with regard to context and meaning as presented in the respective complex document.

3. The method of claim 1, further comprising:

extracting, for a given type of information, the information presented as a text element in at least one complex document and as a non-text element in at least one complex document.

4. The method of claim 1, wherein the semantic representation includes the extracted information and a context indicating where in the complex document the extracted information is located.

5. The method of claim 1, wherein the extracted information includes information extracted from both unformatted portions and formatted portions of the plurality of complex documents.

6. The method of claim 5, wherein the formatted portions include a table, a list, a picture, a spreadsheet, a graph, or a chart.

7. The method of claim 5, wherein the unformatted portions include text, numbers, or symbols.

8. The method of claim 1, wherein the complex documents are summary plan descriptions.

9. The method of claim 1, wherein the third set includes an annotated data set that is provided to the machine learning process and the machine learning process generates a machine learning model to extract entities based on the provided annotated data set.

10. The method of claim 1, wherein an annotated data set is provided to the machine learning process to generate and train a machine learning model, and wherein the trained machine learning model is utilized to automatically annotate a received unannotated complex document.

11. The method of claim 1, comprising:

receiving a query requesting a type of information common to each of the plurality of complex documents; and returning the requested information in a readable format allowing side-by-side comparison of the extracted information for each of the plurality of complex documents.

* * * * *